Dec. 8, 1953   R. R. CROOKSTON ET AL   2,661,494
DEVICE FOR CLEANING PIPE THREADS
Filed Sept. 17, 1951                               5 Sheets-Sheet 1

INVENTORS.
Robert R. Crookston,
Stanley C. Brown,
BY
AGENT.

INVENTORS.
Robert R. Crookston,
Stanley C. Brown,
BY

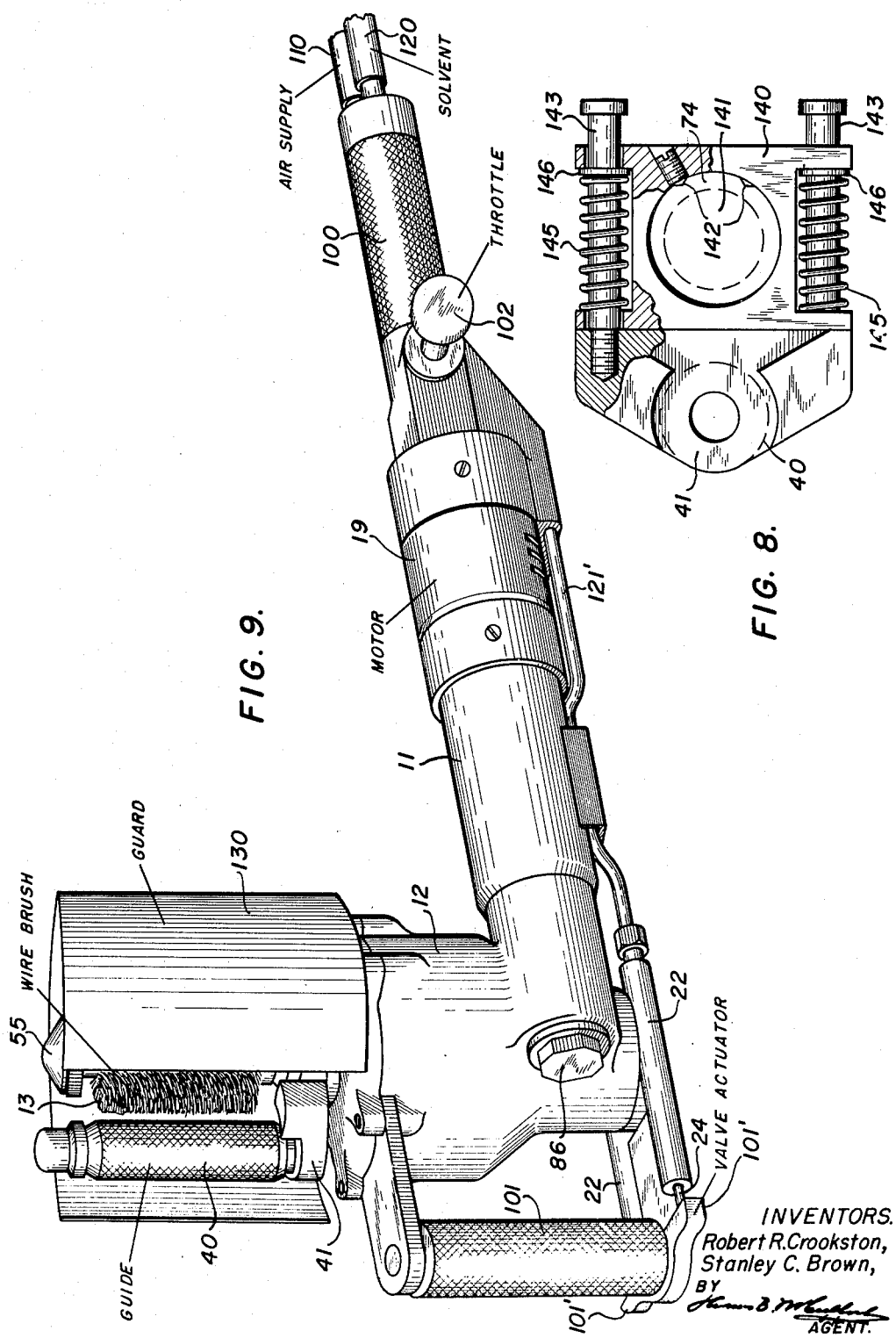

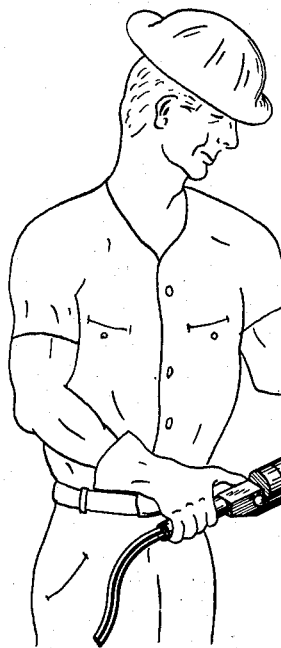
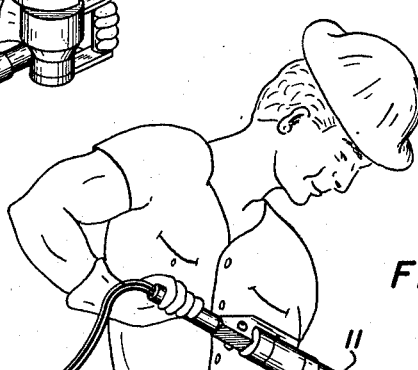
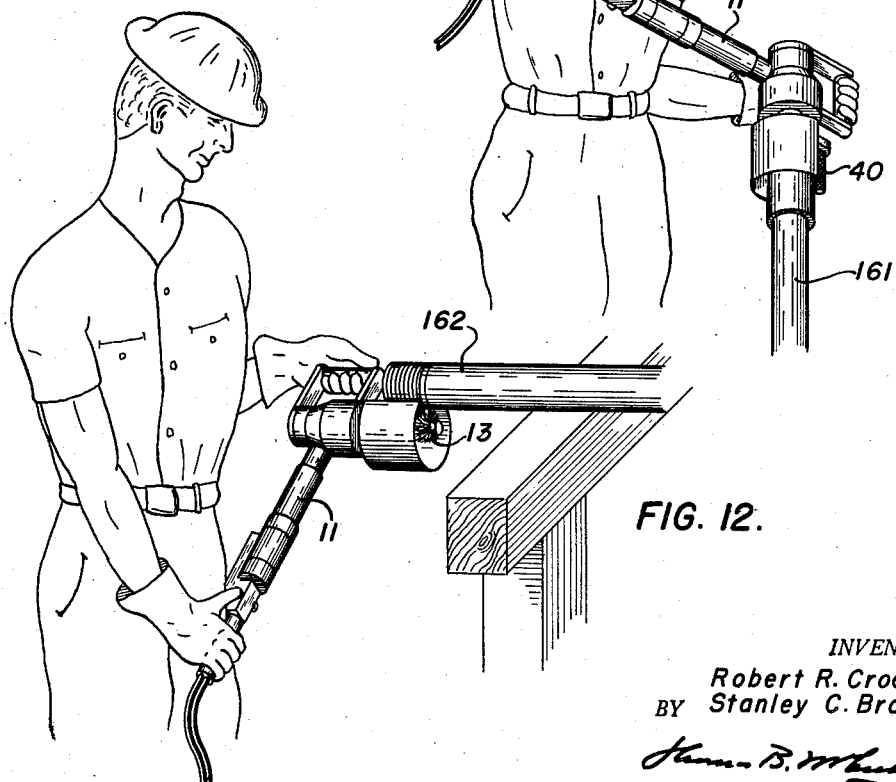
FIG. 10
FIG. 11.
FIG. 12.
INVENTORS.
Robert R. Crookston,
Stanley C. Brown,
BY
AGENT.

Patented Dec. 8, 1953

2,661,494

UNITED STATES PATENT OFFICE 2,661,494

DEVICE FOR CLEANING PIPE THREADS

Robert R. Crookston and Stanley C. Brown, Houston, Tex., assignors, by mesne assignments, to Standard Oil Development Company, Elizabeth, N. J., a corporation of Delaware Application September 17, 1951, Serial No. 246,892

14 Claims. (Cl. 15—387)

The present invention is directed to a device for cleaning pipe threads. More particularly, the apparatus is directed to a device for removing foreign materials from pipe threads and the like.

The present invention will be briefly described as involving a device for cleaning pipe threads which comprises an elongated body member which has a power means arranged in the body member. The body member has means attached thereto for transmitting energy to the power means. On one end of the body member is arranged a housing which may be arranged laterally thereto, such as in perpendicular relationship. A peripheral scouring member, such as a wire brush having a conical or cylindrical shape, is rotatably mounted on the housing. A power transmission means is arranged in the housing operatively connecting the power means with the scouring means to allow the latter to be rotated on operation of the power means. A guide means is also rotatably mounted on the housing spaced away from the periphery of the scouring means. Means are also arranged in the housing operatively connected to the power transmission means for rotating the guide means circumferentially to the scouring means in an opposite direction thereto and at a velocity substantially less than the velocity of rotation of the scouring means.

The apparatus of the present invention is provided with a conduit which may be connected to a source of high pressure fluid which may be employed to supply energy to operate the power means. The high pressure fluid may also be connected to suitable conduits leading to the scouring means and coaxially therewith to allow discharge of fluid radially from the scouring means. The high pressure fluid employed to energize the power means is preferably a gasiform fluid and a source of this fluid may also be discharged radially from the scouring means. Liquid may also be supplied to the scouring means to allow cleaning of the pipe threads with the liquid as well as abrasion thereof by the scouring means.

The apparatus of the present invention is preferably equipped with gripping means on each end thereof to allow the operator to manipulate it conveniently. The apparatus of the present invention is also provided with valve means for controlling the flow of fluid to the power means and to the scouring means.

The invention will be further illustrated by reference to the drawing in which

Fig. 4 is a view taken along the line 4—4 of Fig. 1;

Fig. 5 is a detail sectional view showing the valve arrangement of the present invention;

Fig. 6 is detail view of the throttle valve of the present invention;

Fig. 7 is a view taken along line 7—7 of Fig. 2;

Fig. 8 is a view partly in section of a portion of the device of the present invention;

Fig. 9 is a perspective view of the apparatus of the present invention;

Fig. 10 illustrates an application of the apparatus in cleaning external pipe threads with the pipe in a vertical position;

Fig. 11 is an illustration of the operation of the apparatus in cleaning internal pipe threads with the pipe in a vertical position; and Fig. 12 is a view of the application of the device for cleaning external pipe threads with the pipe in a horizontal position.

Figure 1:
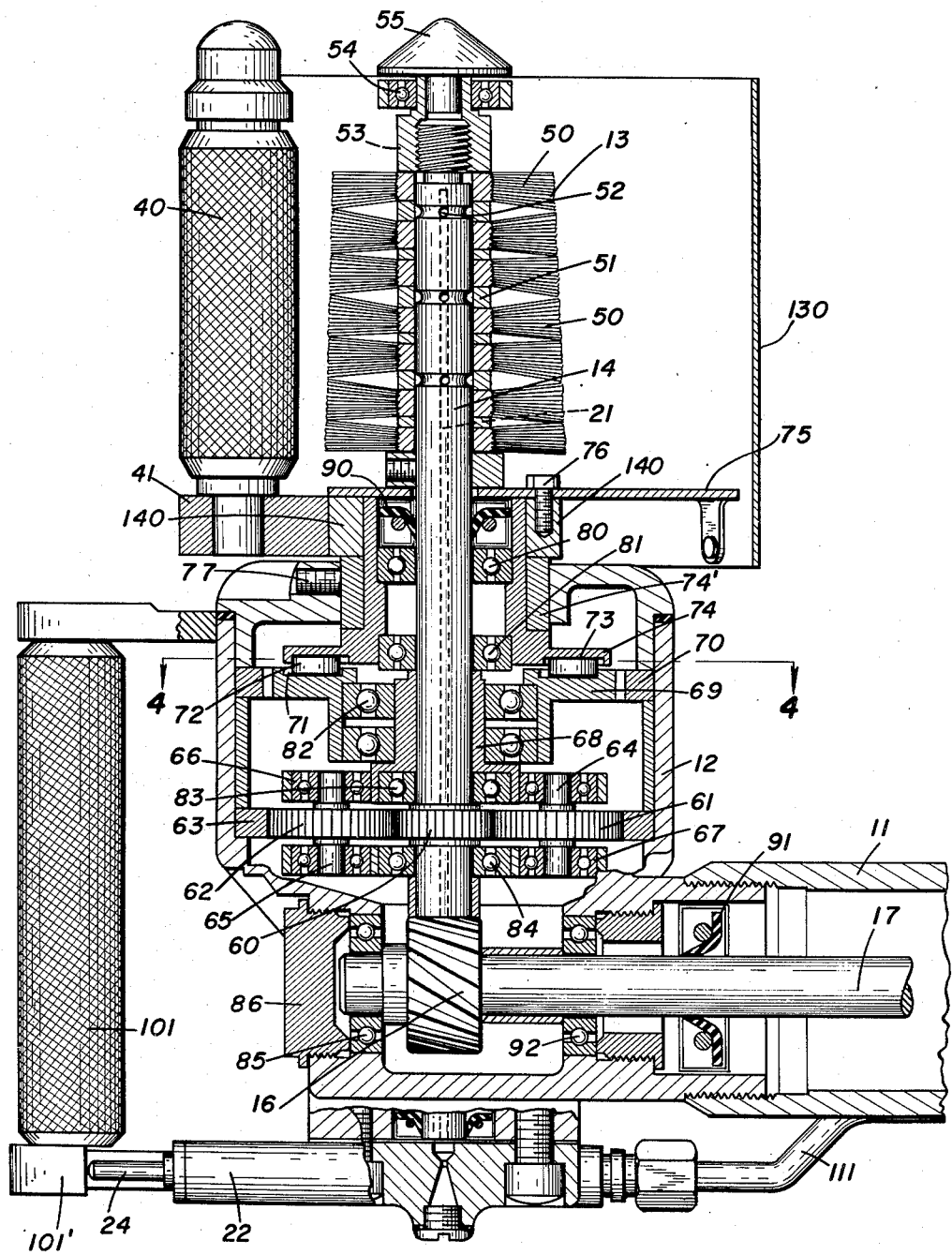
Fig. 1 is a sectional view, partly in elevation, of a portion of the apparatus of the present invention.
Figure 2:
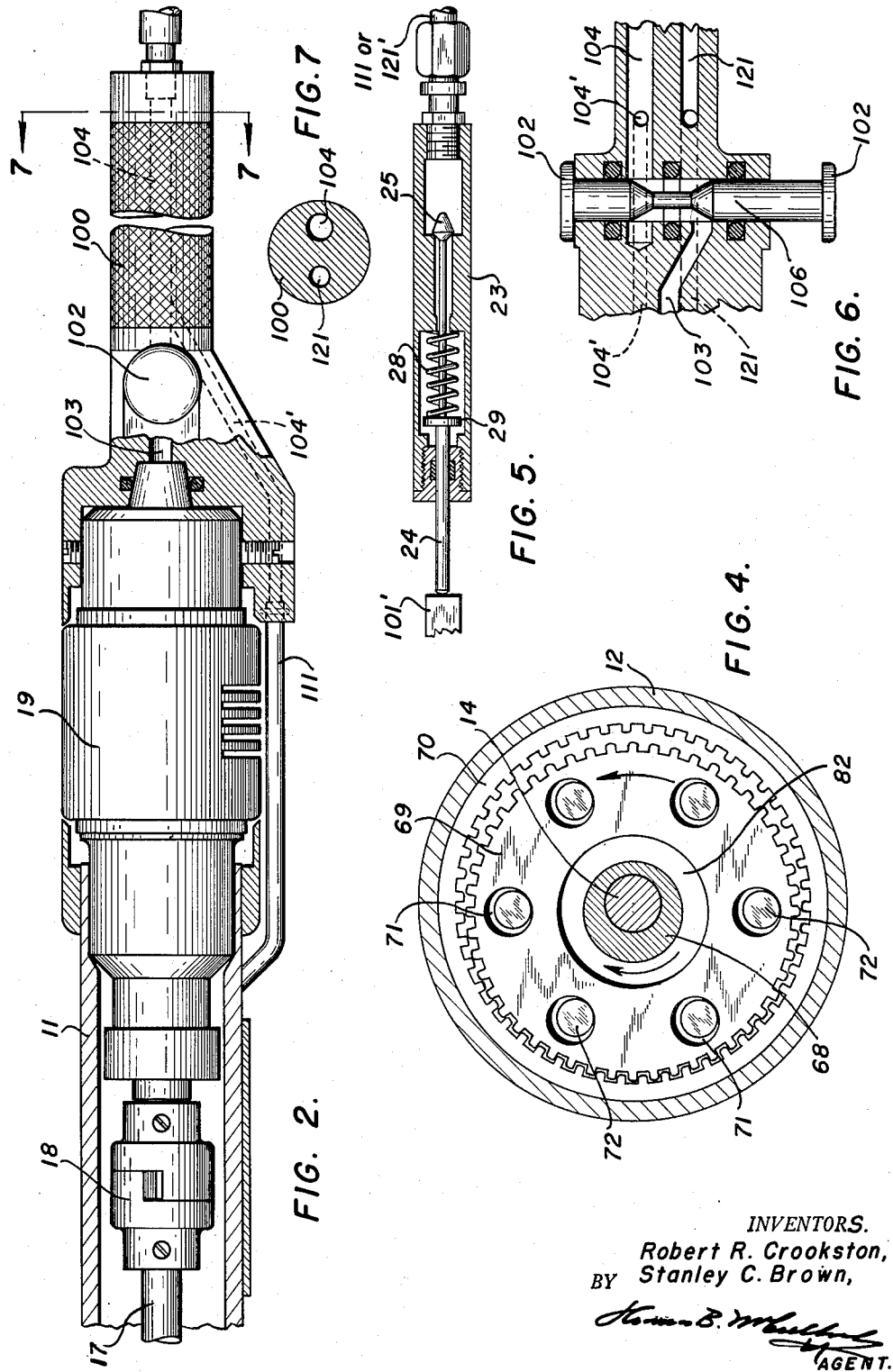
Fig. 2 is a sectional view, but drawn to a smaller scale, of the remainder of the device shown in Fig. 1.
Figure 3:
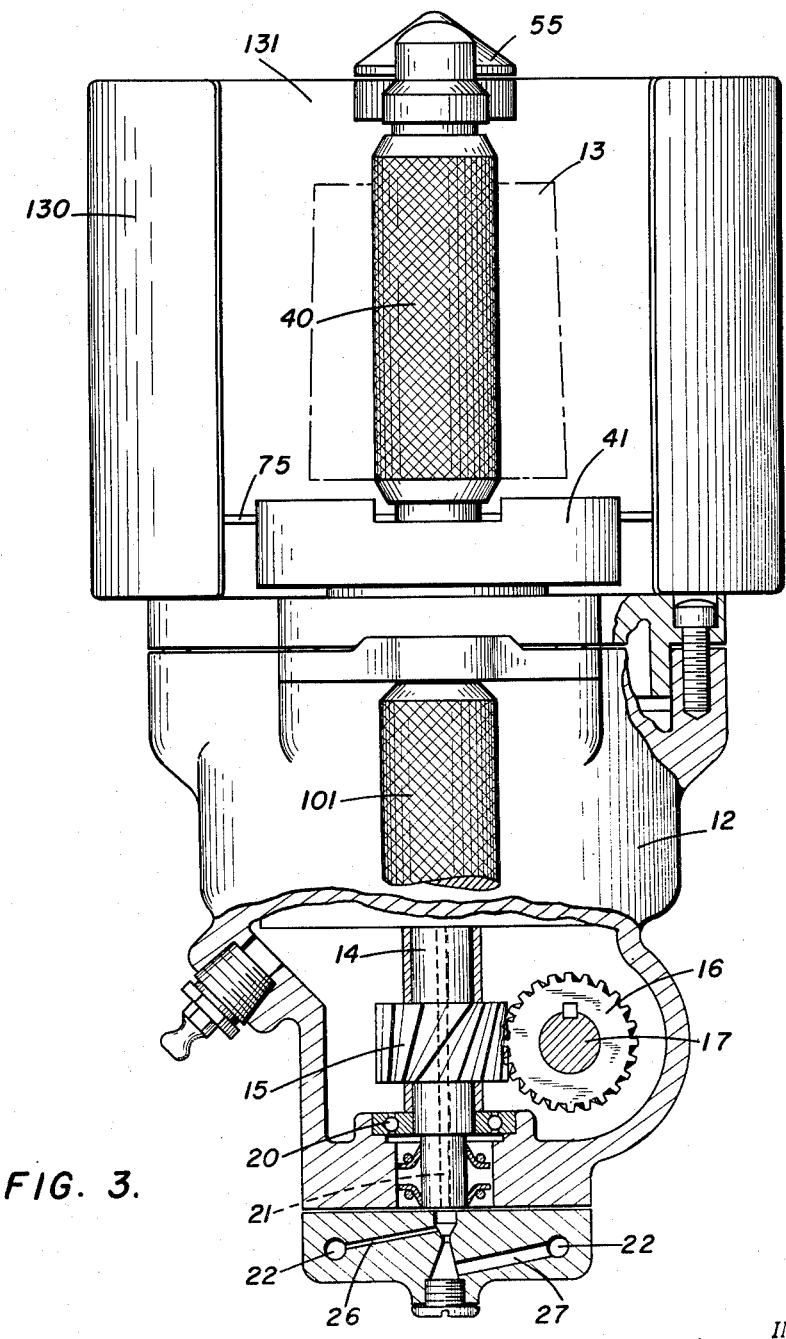
Fig. 3 is a view of the device of Fig. 1 but taken at right angles to the view of Fig. 1 with part in elevation and part in section.

Referring now to the drawing and particularly to Figs. 1, 2 and 3, numeral 11 designates an elongated body member on which is arranged adjacent one end thereof a housing 12. Rotatably mounted on housing 12 is a scouring member 13, such as a wire brush, tapered from a smaller to a larger diameter from top to bottom. The scouring member 13 is mounted on a shaft 14 which is connected through gears 15 and 16 to a shaft 17 which, in turn, is connected by coupling 18 to a fluid driven motor 19. The shaft 14 rotates in the bearing 20 and is provided with an internal passageway 21 which communicates with valves 22 shown more clearly in Fig. 3. Valve 22 comprises a body member 23 and is arranged to be opened by pressure exerted on pin 24. Pressure exerted on pin 24 causes the valve member 25 to unseat allowing passage of fluid through passageways 26 and 27, as will be described further, to passageway 21. The valve 22 is provided with a spring 28 which bears against the shoulder 29 of pin 24 and against an inner surface of body 23. The spring 28 holds the valve ordinarily in a closed position urging the pin 24 to the left.

Rotatably mounted on the housing 12 is an upstanding guide member 40 which is spatially mounted from the periphery of scouring member 13. The upstanding guide means 40 is arranged to rotate freely on member 41 and is mounted as is shown more clearly in Fig. 8. Support 41 is arranged to rotate in a direction opposite to the direction of rotation of scouring means 13 and at a velocity substantially less than the velocity of rotation of scouring means 13.

The scouring means 13 may be composed of a plurality of wire brushes 50 spaced apart from each other by spacers 51. The scouring means 13 as mentioned before is mounted on shaft 14 which has an inner passageway 21 through which fluid may be introduced and discharged radially from the scouring means 13 through discharge ports 52. The scouring means 13 is held on shaft 14 by a lock nut 53 and is designed to rotate freely on bearing 54. A cap 55 covers the bearing 54 as shown.

Arranged in the housing 12 is a power transmission means which transmits power from the power means 19 through shaft 17 and gears 15 and 16 to the scouring means 13 and the guide means 40. This power transmission means includes a series of ring and planetary gears. A gear 60 is arranged on the shaft 14 and meshes with planetary gears 61 and 62 which are designed to rotate in a ring gear 63. Planetary gears 61 and 62 are mounted on trunnions 64 and 65, respectively. Arranged above and below gears 61 and 62 are rollers 66 and 67. Attached to roller 66 is an eccentric bushing 68 which is connected to a precession gear 69 which is arranged to operate in ring gear 70 which is fixed in the housing 12. Arranged in recesses 71 of gear 69 are buttons 72 which are adapted to fit into and work in recesses 73 of a rotatable member 74. Member 74 is rotatably mounted in housing 12 by bearing ring 74' which is held in place by set screw 77. Member 74 is also rotatably mounted on shaft 14 as these two units are caused to rotate in opposite directions. Roller support member 41 is adjustably attached to the upper portion of member 74 by member 140 which is affixed to member 74 by set screws 142. Attached to member 140 by set screw 76 is a plate or support member 75 which carries affixed to its outer edge a cylindrical guard member 130.

The shaft 14 and the power transmission means including the several ring and planetary gears are designed to rotate freely by means of bearings 80, 81, 82, 83 and 84. Likewise, the shaft 17 rotates in bearing 85, access thereto being had by cap nut 86.

To provide a seal for the power transmission means in housing 12 a first sealing element 90 seals the interior of housing 12 from debris loosened by the scouring means 13 and maintains oil in the housing 12. A second sealing means 91 provides a seal for the shaft 17. The shaft 17 is also provided with a bearing 92.

The elongated body member 11 is provided at one end with a horizontal gripping means or handle 100. Pivotally attached to housing 12 is a second gripping means or handle 101. Affixed to the lower end of gripping means 101 is a pair of horizontally extending ears 101' which bear against the ends of pins 24 of valve member 22. Rotation of member 101 to the right or left causes either of valves 22 to open, allowing passage of fluid therethrough. Adjacent the first gripping means 100 is a control valve 102 which serves to admit air to the power means 19 through conduit 103. The valve means 102 is of the push-button type and is shown in detail in Fig. 6.

Referring to Fig. 6 it will be seen that a conduit 104 introduces gasiform fluid to the valve 102 and by pressing the member 106 downward the gasiform fluid in conduit 104 under pressure is allowed to pass through the body of the valve 102 into passageway 103 and thence to the motor 19 which is a fluid driven motor of the vane type well-known to the art. Attached to the end of gripping means 100 is a first conduit or base member 110 which connects to valve 102 through passageway 104 and hence to passageway 103 and motor 19. Passageway 104 is also fluidly connected to passageway 104' which is connected to one of valves 22 through conduit 111.

The gasiform fluid introduced through conduit 110 serves to operate motor 19 and also to provide a gasiform fluid to be discharged from scouring means 13 by ports 52 in shaft 14. A second conduit 120 attached to gripping means introduces a hydrocarbon solvent into a passageway 121 which communicates by way of conduit 121' with one of valves 22 which optionally allows solvent to be discharged from the ports 52 in shaft 14.

The scouring means 13 is surrounded by a guard 130 which is provided with a window 131 which allows the guide means 40 to be expanded outwardly, as will be described, to allow cleaning of various sizes of pipe threads. This guard means 130 is attached to plate 75 and is designed to rotate therewith and with the guide means 40.

Referring now to Fig. 8, the supporting member 41 is attached to a plate member 140 which defines an opening 141 through which the shaft 14 and member 74 project. This plate 140 is held against the member 74 by set screws 142. Projecting through the plate 140 are pins 143 which are threadably connected to the support member 41. Arranged between the inset portions of plate 140 and surrounding pins 143 are springs 145 which when depressed by bushing 146 allows the plate member 41 and the guide member 40 to be swung outwardly.

The apparatus of the present invention operates in the following manner. A gasiform fluid, such as air, is introduced from a source of pressure through conduit 110 into conduit 104 which, on opening valve 102, allows the gasiform fluid to be introduced into fluid driven motor 19 which causes shaft 17 to rotate and, likewise, causes shaft 14 through gears 15 and 16 to rotate at a high speed. Through the series of gears 60, 61, 62, 69 and 70 rotation in an opposite direction and at a reduced speed is transmitted to guide member 40 and to guard 130 which allows these two elements to rotate circumferentially to the scouring member 13 and at a much reduced speed. For example, the scouring member 13 may rotate at 6000 R. P. M. while the guide member 40 and the guard member 130 may rotate at 50 R. P. M. The device prior to energizing may be placed in contact with a vertically arranged pipe 160 with the guide member 40 inside the pipe as is shown in Fig. 10 with the scouring means 13 held against the pipe threads, as shown, which allows the threads to be cleaned.

In Fig. 11 the operator is cleaning the internal threads of a vertically held pipe 161 with the guide member 40 on the exterior thereof while the scouring member 13 is cleaning the internal threads.

In Fig. 12 the device is being employed to clean the external threads of a horizontal pipe 162.

While the invention has been described and illustrated with particular reference to employment of a fluid operated motor, it is to be understood that the power means may be electrically driven. It is preferred, however, to use an air operated motor since the air may serve to drive the motor as well as to discharge from the scouring means to aid in removing debris from the work area.

The nature and objects of the present invention having been completely described and illustrated, what we wish to claim as new and useful and to secure by Letters Patent is:

1. A device for cleaning pipe threads which comprises, in combination, an elongated body member, power means arranged in said body member, means for transmitting energy to said power means, a housing arranged on said body member adjacent one end of said body member, a scouring member for cleaning a peripheral surface rotatably mounted on said housing, power transmission means arranged in said housing operatively connecting said power means and said scouring means for rotating said scouring means, guide means revolvably mounted on said housing for revolution circumferentially of the periphery of said scouring means, and means arranged in said housing operatively connected to said power transmission means for revolving said guide means circumferentially of said scouring means.

2. A device for cleaning pipe threads which comprises, in combination, an elongated body member, fluid driven power means arranged in said body member, means for introducing fluid under pressure to said power means, a housing arranged on said body member adjacent one end of said body member, a scouring member for cleaning a peripheral surface rotatably mounted on said housing, power transmission means arranged in said housing operatively connecting said power means and said scouring means for rotating said scouring means, guide means revolvably mounted on said housing for revolution circumferentially of the periphery of said scouring means, and means arranged in said housing for revolving said guide means circumferentially of said scouring means.

3. A device for cleaning pipe threads which comprises, in combination, an elongated body member, fluid driven power means arranged in said body member, means for introducing fluid under pressure to said power means, a housing arranged on said body member adjacent and in lateral relationship to one end of said elongated body member, a scouring member for cleaning a peripheral surface rotatably mounted on said housing, power transmission means arranged in said housing operatively connecting said power means and said scouring means for rotating said scouring means, guide means revolvably mounted on said housing for revolution circumferentially of the periphery of said scouring means, and means arranged in said housing operatively connected to said power transmission means for revolving said guide means circumferentially of said scouring means.

4. A device for cleaning pipe threads which comprises, in combination, an elongated body member, fluid driven power means arranged in said body member, means for introducing fluid under pressure to said power means, a housing arranged on said body member adjacent to and in perpendicular relationship to one end of said elongated body member, a scouring member for cleaning a peripheral surface rotatably mounted on said housing, power transmission means arranged in said housing operatively connecting said power means and said scouring means for rotating said scouring means, guide means revolvably mounted on said housing for revolution circumferentially of the periphery of said scouring means, and means arranged in said housing operatively connected to said power transmission means for revolving said guide means circumferentially of said scouring means.

5. A device for cleaning pipe threads which comprises, in combination, an elongated body member, fluid driven power means arranged in said body member, means for introducing fluid under pressure to said power means, a housing arranged on said body member adjacent and in perpendicular relationship to one end of said elongated body member, a scouring member for cleaning a peripheral surface rotatably mounted on said housing, power transmission means arranged in said housing operatively connecting said power means and said scouring means for rotating said scouring means, guide means revolvably mounted on said housing for revolution circumferentially of the periphery of said scouring means, and means arranged in said housing operatively connected to said power transmission means for revolving said guide means circumferentially of said scouring means.

6. A device for cleaning pipe threads which comprises, in combination, an elongated body member, fluid driven power means arranged in said body member, means for introducing fluid under pressure to said power means, a housing arranged on said body member adjacent and in perpendicular relationship to one end of said elongated body member, a scouring member for cleaning a peripheral surface rotatably mounted on said housing, power transmission means arranged in said housing operatively connecting said power means and said scouring means for rotating said scouring means, guide means revolvably mounted on said housing for revolution circumferentially of the periphery of said scouring means, means arranged in said housing operatively connected to said power transmission means for revolving said guide means circumferentially of said scouring means, and means for discharging fluid under pressure radially from said scouring means.

7. Apparatus in accordance with claim 6 in which the means for discharging fluid under pressure radially from said scouring means is arranged coaxially with said scouring means.

8. A device for cleaning pipe threads which comprises, in combination, an elongated body member, fluid driven power means arranged in said body member, means for introducing fluid under pressure to said power means, valve means arranged in a conduit connected to said power means for controlling the flow of said fluid to said power means, a housing arranged on said elongated body member adjacent and in lateral relationship to one end of said elongated body member, a scouring member for cleaning a peripheral surface rotatably mounted on said housing, power transmission means arranged in said housing operatively connecting said power means and said scouring means for rotating said scouring means, guide means revolvably mounted on said housing for revolution circumferentially of the periphery of said scouring means, means arranged in said housing operatively connected to said power transmission means for revolving said guide means circumferentially of said scouring means, means for discharging fluid radially from said scouring means arranged coaxially with said scouring means, at least a conduit connected to said means for discharging fluid from said scouring means, and valve means for controlling the discharge of fluid from said scouring means.

9. A device for cleaning threads which comprises, in combination, an elongated body member, fluid driven power means arranged in said body member, means for introducing fluid under pressure to said power means, a housing arranged in said body member adjacent and in lateral relationship to a first end of said elongated body member, a scouring member for cleaning a peripheral surface rotatably mounted on said housing, power transmission means arranged in said housing operatively connecting said power means and said scouring means for rotating said scouring means, guide means revolvably mounted on said housing for revolution circumferentially of the periphery of said scouring means, means arranged in said housing operatively connected to said power transmission means for revolving said guide means circumferentially of said scouring means, and gripping means on the first end and a second end of said elongated body member.

10. A device for cleaning pipe threads which comprises, in combination, an elongated body member, fluid driven power means arranged in said body member, means for introducing fluid under pressure to said power means, a housing arranged on said body member adjacent and in lateral relationship to a first end of said elongated body member, a scouring member for cleaning a peripheral surface rotatably mounted on said housing, power transmission means arranged in said housing operatively connecting said power means and said scouring means for rotating said scouring means, guide means revolvably mounted on said housing for revolution circumferentially of the periphery of said scouring means, means arranged on said housing operatively connecting to said power transmission means for revolving said guide means circumferentially of said scouring means, means for discharging fluid under pressure radially from said scouring means, and gripping means arranged on the first and a second end of said elongated body member.

11. A device in accordance with claim 10 in which the scouring means is a wire brush.

12. A device for cleaning pipe threads which comprises, in combination, an elongated body member, fluid driven power means arranged in said body member, means for introducing fluid under pressure to said power means, a housing arranged on said body member adjacent and in lateral relationship to a first end of said elongated body member, a scouring member for cleaning a peripheral surface rotatably mounted on said housing, power transmission means arranged in said housing operatively connecting said power means and said scouring means for rotating said scouring means, a guide means and a guard means revolvably mounted on said housing for revolution circumferentially of the periphery of said scouring means, said guard means substantially surrounding said scouring means, means arranged on said housing operatively connecting to said power transmission means for revolving said guide means and guard means circumferentially of said scouring means, means for discharging fluid under pressure radially from said scouring means, and gripping means arranged on the first and a second end of said elongated body member.

13. A device for cleaning pipe threads which comprises, in combination, an elongated body member, fluid driven power means arranged in said body member, means for introducing fluid under pressure to said power means, a housing arranged on said body member adjacent and in lateral relationship to a first end of said elongated body member, a scouring member for cleaning a peripheral surface rotatably mounted on said housing, power transmission means arranged in said housing operatively connecting said power means and said scouring means for rotating said scouring means, guide means revolvably mounted on said housing for revolution circumferentially of the periphery of said scouring means, guard means revolvably mounted on said housing for revolution circumferentially of the periphery of said scouring means provided with an opening for engaging said threads with said scouring means and adapted to revolve with said guide means, means arranged on said housing operatively connecting to said power transmission means for revolving said guide means and guard means circumferentially of said scouring means, means for discharging fluid under pressure radially from said scouring means, and gripping means arranged on the first and a second end of said elongated body member.

14. A device for cleaning pipe threads which comprises, in combination, a frame assembly, a scouring member for cleaning a peripheral surface rotatably mounted on said frame assembly, guide means revolvably mounted on said frame assembly for revolution circumferentially of the periphery of said scouring means, power means, and power transmission means carried by said frame assembly operatively connecting said power means with said scouring means and guide means for rotating said scouring means and for revolving said guide means circumferentially of said scouring means.

ROBERT R. CROOKSTON.
STANLEY C. BROWN.

References Cited in the file of this patent
UNITED STATES PATENTS

| Number | Name | Date |
| --- | --- | --- |
| 2,305,079 | Heldenbrand | Dec. 15, 1942 |